United States Patent

Yuan et al.

[11] Patent Number: 5,883,763
[45] Date of Patent: Mar. 16, 1999

[54] READ/WRITE HEAD HAVING A GMR SENSOR BIASED BY PERMANENT MAGNETS LOCATED BETWEEN THE GMR AND THE POLE SHIELDS

[75] Inventors: Samuel W. Yuan, San Carlos; Robert Earl Rottmayer, Fremont; Matthew J. Carey, San Jose, all of Calif.

[73] Assignees: Read-Rite Corporation, Milpitas; Regents of the University of California, Oakland, both of Calif.

[21] Appl. No.: 912,827

[22] Filed: Aug. 19, 1997

[51] Int. Cl.$^6$ .................................................... G11B 5/39
[52] U.S. Cl. ............................................................ 360/113
[58] Field of Search ........................... 360/113; 338/32 R; 324/252, 207.21

[56] References Cited

U.S. PATENT DOCUMENTS 5,576,914  11/1996  Rottmayer et al. ..................... 360/113

Primary Examiner—Robert S. Tupper
Attorney, Agent, or Firm—Nathan N. Kallman

[57] ABSTRACT

A compact read/write head having a biased giant magnetoresistive sensor. Permanent magnet films are placed adjacent to the giant magnetoresistive sensor operating in the current-perpendicular-to the-plane (Cpp) mode and spaced with respect to the sensor by conducting films. These permanent magnet films provide a magnetic bias. The bias field is substantial and fairly uniform across sensor height. Biasing of the giant magnetoresistive sensor provides distinguishable response to the rising and falling edges of a recorded pulse on an adjacent recording medium, improves the linearity of the response, and helps to reduce noise. This read/write head is much simpler to fabricate and pattern and provides an enhanced uniformity of the bias field throughout the sensor.

13 Claims, 3 Drawing Sheets

READ/WRITE HEAD HAVING A GMR SENSOR BIASED BY PERMANENT MAGNETS LOCATED BETWEEN THE GMR AND THE POLE SHIELDS

CROSS-REFERENCE TO RELATED APPLICATION

Copending U.S. application Ser. No. 08/542,988 filed Oct. 13, 1995, and assigned to the same assignee as the present application, discloses a structure for a thin film magnetic head incorporating a giant magnetoresistive (GMR) read transducer. The subject matter of that application is related to the present application and is incorporated herein by reference.

FIELD OF THE INVENTION

This invention relates to thin film magnetic heads and in particular to a method and apparatus of biasing the sensor in a high density giant magnetoresistive (GMR) transducer.

BACKGROUND OF THE INVENTION

Magnetoresistive (MR) read sensors are used in magnetic disk and tape systems to read signals in the form of changes in magnetic flux. Typically, MR read sensors are rectangular multi-layered structures in which thin film layers are deposited on a substrate.

Presently known thin film magnetic heads, known as merged heads, include an inductive write element for recording signals and a magnetoresistive (MR) sensor for reading the recorded signals. Write operations are carried out inductively using a pair of magnetic write poles which form a magnetic path and define a transducing nonmagnetic gap in the pole tip region. The transducing gap is positioned close to the surface of an adjacent recording medium such as a rotating magnetic disk. An electrical coil formed between the poles causes flux flow in the magnetic path of the poles in response to a current in the coil that is representative of signal information to be recorded.

Read operations are carried out by the MR sensor which is spaced from a pair of magnetic shields. The MR sensor changes resistance in response to changes in magnetic flux on the adjacent magnetic medium. A sensing electric current passed through the MR sensor senses the resistance of the MR sensor, which changes in proportion to changes in the magnetic flux.

Conventionally, the MR sensor is electrically isolated from the pair of magnetic shields. A separate set of conductors are provided on one surface of the MR sensor to pass a reference current through the MR sensor in a current-in-the-plane (CIP) mode. However, the CIP mode can create problems such as shorting due to electromigration. Also, a CIP mode MR sensor can be relatively large in size and expensive to mass produce because of its complex construction.

More recently, a compact MR head has been developed in which the magnetic write poles serve also as the shields for the MR sensor and further as a means for conducting the MR sense current. The structure and method of forming such a compact MR head is disclosed in U.S. Pat. No. 5,446,613 "Magnetic Head Assembly With MR Sensors" by Robert E Rottmayer, issued Aug. 29, 1995, which is incorporated herein by reference.

In U.S. Pat. No. 5,446,613, a thin film magnetic head incorporates an inductive write portion including two pole/shield layers and a read portion including a giant magnetoresistive (GMR) sensor. The pole/shield layers are relatively thick and serve as conductive leads which can carry high current with minimal heating and low current density. The GMR sensor defines data track width and thus minimizes off-track reading of data.

Another prior art reference is U.S. Pat. No. 5,576,914, entitled "Compact Read/Write Head Having Biased GMR Element" by Robert Rottmayer et al. issued on Nov. 19, 1996, which is incorporated herein by reference. In U.S. Pat. No. 5,576,914, a compact read/write head is provided having a magnetically biased GMR sensor which provides reduced noise in the read signal and improves the linearity and gain of flux sensing. Biasing of the GMR sensor provides distinguishable response to the rising and falling edges of a recorded pulse on an adjacent magnetic recording medium. Biasing also improves the linearity of the response and helps to reduce noise. The GMR sensor is magnetically biased such that the major domains of alternate GMR layers define a scissor-type configuration when no excitation field is supplied by an adjacent recording medium.

When an excitation field is supplied by the adjacent record medium, it rotates the scissors configuration from a crossed (90°) state towards either a closed (0°) state or an anti-parallel (180°) state, depending on the polarity of the excitation field. The resultant change in cosine (and resistance of the GMR sensor which is a function of cosine) is therefore from zero to a positive one (cosine 90°=+1.0) or to a negative one (cosine 180°=−1.0). The resultant change in resistance of the GMR sensor therefore indicates the polarity of change of the excitation field. A disadvantage of this approach is that the structure is complex and therefore difficult to manufacture.

It is therefore desirable to provide a method and apparatus to bias a GMR current flowing perpendicular through the major plane (Cpp) head using a method that is simple to manufacture and provides an essentially uniform field throughout the sensor.

SUMMARY OF THE INVENTION

The invention is direct to a magnetic head for detecting flux transitions in an adjacent magnetic recording medium storing magnetically oriented regions. The magnetic head comprises a giant magnetoresistive (GMR) sensor disposed between a first magnetic pole shield and a second magnetic pole shield, with the GMR being perpendicular to the magnetic medium. A first magnetic layer is placed adjacent to the GMR between the GMR and the first magnetic pole shield.

In accordance with an aspect of the invention, a second magnetic layer is placed adjacent to the GMR between the GMR and the second magnetic pole shield. One or both of the first and second magnetic layers may be either a permanent magnet or a soft film coupled with an antiferromagnetic layer.

In accordance with an aspect of the invention, the magnetic layers are such that a magnetic fringing field is created that is characterized by a coercivity less than the coercivity of the magnetic recording medium when no excitation field is supplied by the magnetic recording medium.

The invention has the advantage that the structure is much simpler to fabricate and pattern and provides an enhanced uniformity of the bias field throughout the sensor.

The invention also has the advantage that the configuration allows for the use of two voltage probes that can be easily separated from the current flowing in the poles, providing a four-point probe configuration.

DESCRIPTION OF THE PREFERRED EMBODIMENT

Figure 1:
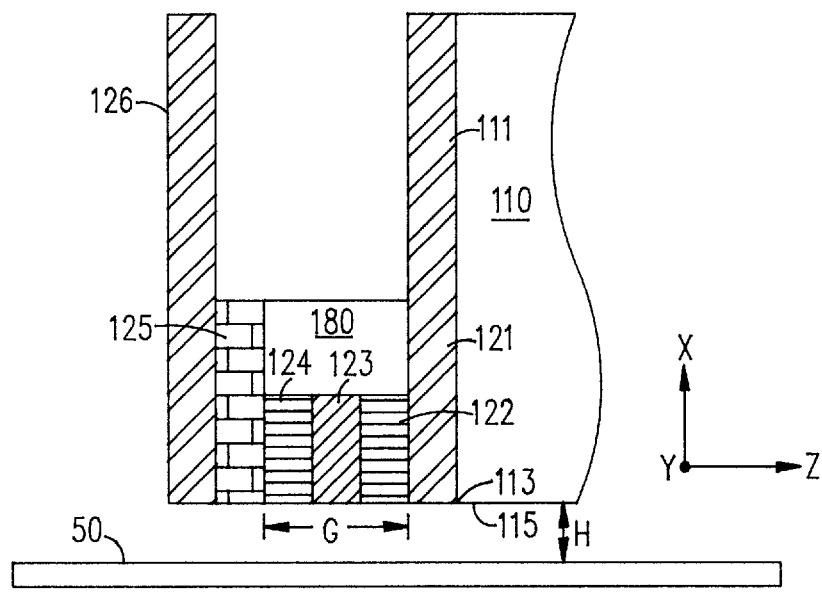
FIG. 1 is a cross-sectional side view of a biased giant magnetoresistor (GMR) head structure of the prior art.

FIG. 1 depicts a portion of a biased giant magnetoresistor (GMR) head structure of the prior art U.S. Pat. No. 5,576,914. The magnetic medium 50, a rotatable magnetic disk, is shown in end view, not to scale, and rotates in the Z direction about an axis. The magnetic medium has a number of pre-oriented flux regions defined on its surface during a write process. The flux regions produce X-direction upward or downward fringe fields that change direction depending upon the orientation of the flux regions. As the disk rotates, a magnetoresistive sensor 123 of the head detects the fringe fields and changes resistance accordingly.

Magnetic medium 50 moves relative to the head structure along the Z direction (+Z or −Z). The head structure is spaced from medium 50 in the X direction by an aerodynamically-defined flying height H. The pre-oriented flux regions are defined on the surface of magnetic medium 50 during a data recording process, each directed either in the +Z direction or the −Z direction.

A slider shaped substrate 110 made of a magnetically nonconductive material, such as ceramic, forms a bulk portion of the head structure. Substrate 110 has a substantially planar top surface 111 extending in the X direction, and a medium-facing side wall 115 cut substantially at right angles to top surface 111 extending in the Z direction. The end of top surface 111 that meets with substrate side wall 115 is referred to as the forward edge 113.

A first pole/shield layer 121, made of a material that is both magnetically and electrically conductive (an EC/MC material), is formed on substrate top surface 111 extending to forward edge 113.

The abbreviated form Ex/Mx will be used below to describe the electrical and magnetic conductivity properties of various materials, with x=C meaning it is conductive, x=N meaning it is nonconductive, and x=X meaning it can be either. Thus, EN/MC means electrically nonconductive and magnetically conductive, and EX/MN means the material is either electrically conductive or nonconductive, but it is magnetically nonconductive.

A first contact element 122 made of an EC/MN material is formed over a forward portion of first pole/shield layer 121, near the substrate's forward edge 113.

GMR element 123 is formed over first contact element 122. GMR element 123 may be formed, by way of example, by depositing a plurality of alternating ultra-thin layers of magnetically conductive and nonconductive materials such as cobalt and copper.

A second contact element 124, made of an EC/MN material that is the same or equivalent to that of first contact element 122, is formed over GMR element 123. The Z direction thickness of second contact element 124 is substantially the same as that of first contact element 122.

A second pole/shield layer 125, made of an EC/MC material that is the same or equivalent to that of first and second pole/shield layer 121, is formed over second contact element 124 and extends backwards in the +X direction.

A third pole/shield layer 126, made of an EC/MC material that is the same or equivalent to that of first and second pole/shield layer 121, is formed over second pole/shield layer 125 and extends backwards in the +X direction to define a back gap (not shown) with first pole/shield layer 121.

A planar coil (not shown) having electrically conductive winding members is formed about the back gap and is electrically insulated from pole/shield layers 121 and 126 by EN/MN fill and planarizing structure. A write circuit during a write mode sends electrical current passing through winding members to induce flux flow through the forward and back gaps. Changes in flux flow across the forward gap (G) produce the different magnetic orientations of magnetized regions in magnetic medium 50 during a write operation.

A read circuit connects to opposed back ends of pole/shield layers 121 and 126, and during a read mode sends a sensing electric current passing in the Z direction through sandwiched elements 122 through 124. The read-sense current flows perpendicularly through GMR element 123.

An electrically nonconductive, magnetic biasing element 180 is positioned behind the combination of first contact element 122, GMR element 123 and second contact element 124. Biasing element 180 is also sandwiched between first and second pole/shield layers 121 and 125. Biasing element 180 produces a magnetic biasing field that extends substantially along the X direction (+X or −X) into GMR element 123.

Figure 2:
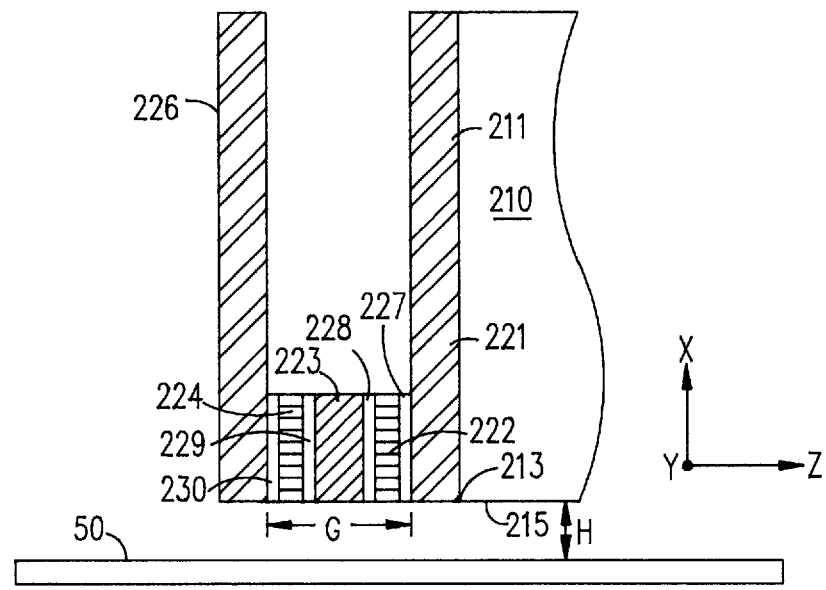
FIG. 2 is a cross-sectional side view of a biased giant magnetoresistor (GMR) head structure in accordance with the invention.
Figure 3:
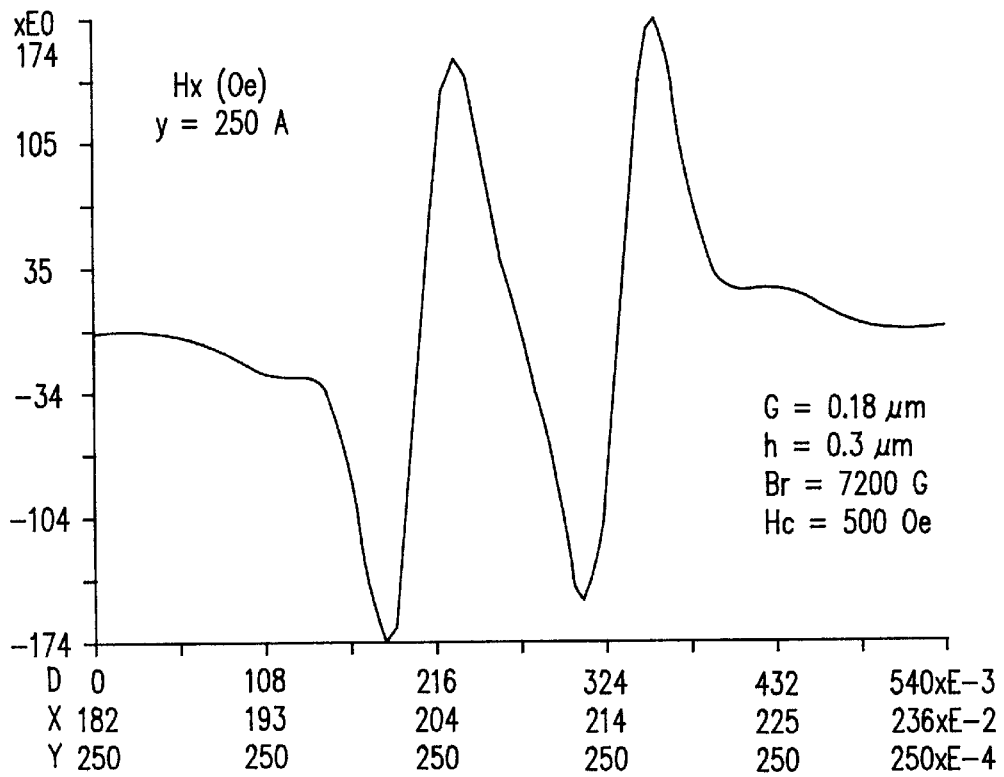
FIG. 3 is a plot of the cosine-like response of a permanent magnet biased GMR sensor to varying flux intensity.
Figure 4:
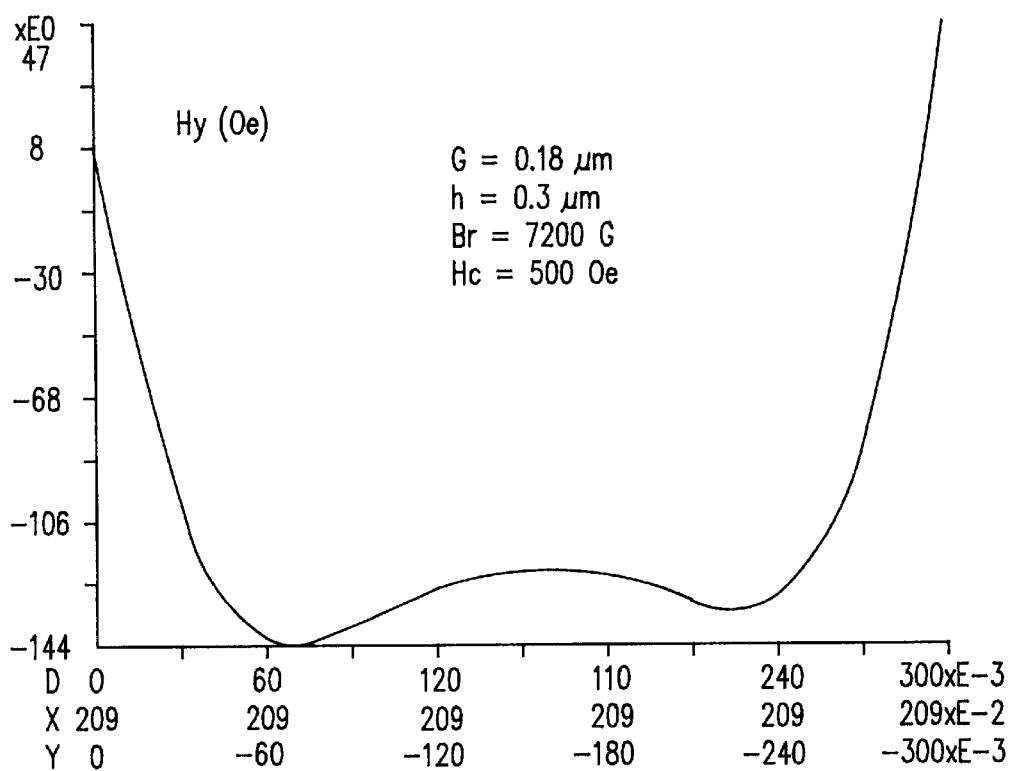
FIG. 4 is a curve showing the magnetization profile of the structure of FIG. 2 under a quiescent state.
Figure 5:
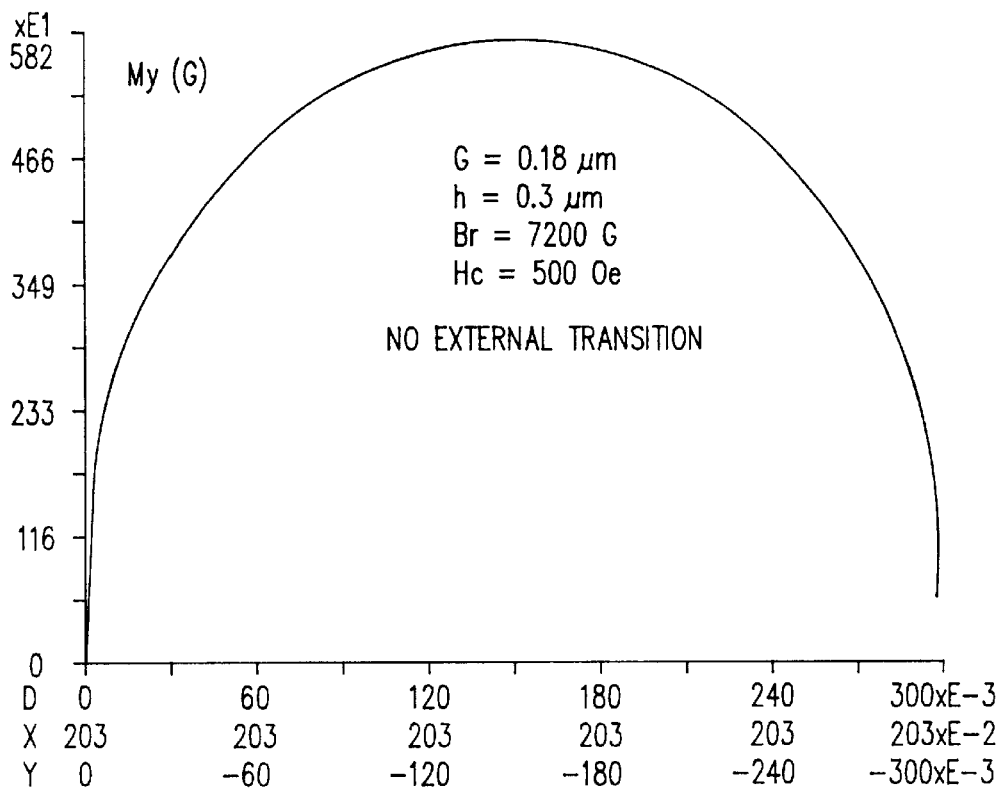
FIG. 5 is a curve showing the magnetization profile of the structure of FIG. 2 under a quiescent state; and, FIG. 6 is a curve showing the magnetization profile of the structure of FIG. 2 directly above one permanent magnet and under media excitation.
Figure 6:
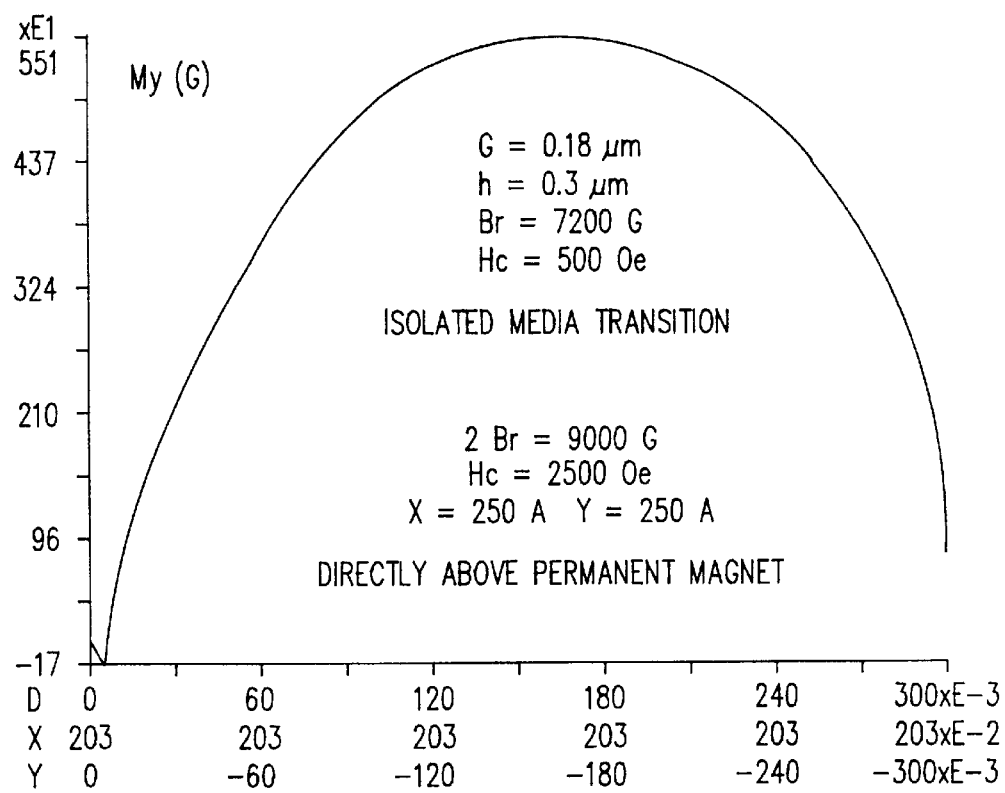

In FIG. 2, the magnetic medium 50, a magnetic disk, is shown in end view, not to scale, and is rotatable about an axis. The air bearing head structure is at a flying height (H) above the surface of the disk. The magnetic medium 50 has a number of pre-oriented flux regions defined on its surface during a write process. The flux regions produce upward or downward fringe fields, depending upon the orientation of the flux regions. A magnetoresistive portion 223 of the head detects the fringe fields and changes resistance accordingly.

As the transition regions on the medium 50 pass by the head structure, a giant magnetoresistive (GMR) portion 223 of the head structure detects the flux or fringe fields and responds by changing its resistance. A slider shaped substrate 210 made of a magnetically nonconductive material, such as ceramic, forms a bulk portion of the head structure and provides aerodynamic lift to a flying height H.

Substrate 210 has a substantially planar top surface 211 extending in the X direction and a medium-facing side wall 215 cut substantially at right angles to top surface 211 and extending in the Z direction. The end of top surface 211 that meets with substrate side wall 215 is referred to as the forward edge 213.

A first pole/shield layer 221, made of a material that is both magnetically and electrically conductive (an EC/MC material), is formed on substrate top surface 211 extending to forward edge 213. The material of first pole/shield layer 221 can be a nickel-iron composition, such as Permalloy, or a ferromagnetic material with high permeability. The Z direction thickness of first pole/shield layer 221 is preferably in the range of 0.5 to 10 microns and more preferably in the range of 2 to 3 microns.

A first contact element 227 made of an EC/MN material is formed over a forward portion of first pole/shield layer 221, near the substrate's forward edge 213. First contact element 227 can be composed of one or a combination of EC/MN materials selected, for example, from the group consisting of copper, gold, silver, and alloys of these metals. The Z direction thickness of first contact element 227 is preferably in the range of 1000 to 2000 Angstroms and more preferably in the range of 300 to 1500 Angstroms.

A first permanent magnet layer 222 of a magnetic material is formed over the first contact element 227. A first spacer layer 228 of an electrically conductive but magnetically nonconductive material is formed over the first permanent magnet layer 222.

GMR element 223 is formed over first spacer layer 228. GMR element 223 may be formed, by way of example, by depositing a plurality of alternating ultra-thin layers of magnetically conductive and nonconductive materials such as cobalt and copper, each layer being approximately 20 Angstroms thick. The overall Z direction thickness of GMR element 223 is preferably in the range of 60 to 1000 Angstroms and more preferably in the range of 100 to 500 Angstroms.

A second spacer layer 229 of an magnetically nonconductive material is formed over the GMR element 223. A second permanent magnet layer 224 of a magnetic material is formed over the second spacer layer 229. A second contact element 230, made of an EC/MN material that is the same or equivalent to that of first contact element 227, is formed over second permanent magnet layer 229. The Z direction thickness of second contact element 230 is substantially the same as that of first contact element 227.

A second pole/shield layer 226, made of an EC/MC material that is the same or equivalent to that of first pole/shield layer 221, is formed over second contact element 230 and extends backwards in the +X direction to define a back gap (not shown) with first pole/shield layer 221. The Z direction thickness of second pole/shield layer 226 is substantially the same as or greater than that of first pole/shield layer 221.

The back gap is filled with a material that is electrically nonconductive and more preferably with a material that is both magnetically and electrically nonconductive, such as $Al_2O_3$, or hard-baked resist.

The X direction length of the transducing gap (G) is preferably 50 to 200 microns and more preferably in the range of 100 to 150 microns. The first and second pole/shield layers 221 and 226 extend in the +X direction beyond sandwiched elements that form the transducing gap (G).

As described above with reference to the prior art, a planar coil (not shown) having electrically conductive winding members is electrically insulated from pole/shield layers 221 and 226 by EN/MN planarizing structure. A write circuit during a write mode sends electrical current passing through winding members to induce flux flow to the transducing gap. Changes in flux across the gap (G) produce the different magnetic orientations of magnetized regions in magnetic medium 50 during a write operation.

A read circuit connects to opposed back ends of pole/shield layers 221 and 226, and during a read mode sends a sensing electric current passing in the Z direction through the sandwiched elements. The read-sense current flows perpendicularly through GMR element 223, thus avoiding the in-the-plane electromigration problems and magnetic-biasing problems associated with earlier designs based on CIP operation.

In operation, write current is applied to the write poles 221, 226. For reading, a sense current is supplied to the GMR sensor 223. The GMR sensor operates in a Cpp mode to change its resistance when a flux transition in the magnetic media 52 excites the head. The pole members act as write poles, read poles and conductive leads.

In the structure shown in FIG. 2, media erasure is not of concern because the fringing field caused by the biasing permanent magnets is less than the coercivity (Hc) of the magnetic recording medium when no excitation field is supplied by said magnetic recording medium. The bias field is substantial and fairly uniform across sensor height.

While the invention has been described with reference to permanent magnets adjacent to the GMR, it should be understood that the GMR can be biased by a soft magnetic element which is a soft film, coupled with antiferromagnetic (AFM) material.

It should be understood that a weak permanent magnet may be demagnetized by the media transition field. The biasing point becomes dependent upon the media transition pattern, density and location, i.e. base-line fluctuation. Therefore a large HC (permanent magnet) or a large Hex (AFM) to is needed to overcome the media field.

FIGS. 3–6 are performance curves showing response of a permanent magnet biased GMR sensor to varying flux intensity and the magnetization profile of the structure of FIG. 2 under a quiescent state and under media excitation.

By virtue of this invention, permanent magnet (PM) films are placed adjacent to a GMR sensor operating in the current perpendicular to the plane (Cpp) mode and are spaced with respect to the sensor by conducting films. These PM films provide a magnetic bias that linearizes the output and improves noise characteristics of the sensor as described in U.S. Pat. No. 5,576,914. This is an improved method of bias for the GMR head described in U.S. Pat. No. 5,576,914. It is much simpler to fabricate and pattern and provides an enhanced uniformity of the bias field throughout the sensor. This configuration allows for the use of two voltage probes that can be easily separated from the current flowing in the poles i.e. 4 point probe configuration.

What is claimed is:

1. A magnetic head for detecting flux transitions in a magnetic recording medium storing magnetically oriented regions comprising:

a first magnetic pole/shield layer;

a second magnetic pole/shield layer;

a giant magnetoresistive sensor layer disposed between said first magnetic pole/shield layer and said second magnetic pole/shield layer;

said giant magnetoresistive sensor layer being perpendicular to said magnetic medium, said sensor layer having a first side and an opposing side;

a first magnetic biasing layer adjacent and parallel to said sides of said giant magnetoresistive sensor layer and located between the first side of said giant magnetoresistive sensor layer and said first magnetic pole/shield layer;

a second magnetic biasing layer adjacent and parallel to said sides of said giant magnetoresistive sensor layer and located between the opposing side of said giant magnetoresistive sensor layer and said second magnetic pole/shield layer; and electrically conductive, magnetically nonconductive spacers located between said giant magnetoresistive sensor layer and said first and second magnetic biasing layers respectively.

2. The magnetic head of claim 1 wherein said first magnetic layer is a permanent magnet.

3. The magnetic head of claim 1 wherein said first magnetic layer is a soft film coupled with an antiferromagnetic layer.

4. The magnetic head of claim 1 wherein said first magnetic layer is a soft film coupled with an antiferromagnetic layer.

5. The magnetic head of claim 1 wherein said first magnetic layer is such that a first magnetic fringing field is produced that is characterized by a coercivity that is less than the coercivity of said magnetic recording medium when no excitation field is supplied by said magnetic recording medium.

6. A magnetic head for detecting flux transitions in a magnetic recording medium having magnetically oriented regions therein comprising:

first and second magnetic pole layers, magnetic shields, and conductive leads for providing a magnetic and electrical circuit;

a read portion including a giant magnetoresistive sensor having two opposing sides disposed between said first and second magnetic pole layers;

a first magnetic biasing layer placed adjacent to one side of said giant magnetoresistive sensor for producing a first magnetic fringing field that is less than the coercivity of said magnetic recording medium when no excitation field is supplied by said magnetic recording medium;

a second magnetic biasing layer placed adjacent to the opposing side of said giant magnetoresistive sensor for producing a second magnetic fringing field that is less than the coercivity of said magnetic recording medium when no excitation field is supplied by said magnetic recording medium; and electrically conductive, magnetically nonconductive spacers located between said giant magnetoresistive sensor and said first and second magnetic biasing layers respectively.

7. The magnetic head of claim 6 wherein at least one of said first and second magnetic layers is a permanent magnet.

8. The magnetic head of claim 6 wherein at least one of said first and second magnetic layers is a soft film coupled with an antiferromagnetic layer.

9. The magnetic head of claim 6 wherein at least one of said first and second magnetic layers is a permanent magnet.

10. The magnetic head of claim 6 wherein at least one of said first and second magnetic layers is a soft film coupled with an antiferromagnetic layer.

11. A magnetic read/write head for detecting flux transitions in a magnetic recording medium storing magnetically oriented regions comprising:

a substrate of a magnetically nonconductive material;

a first pole/shield layer that is both magnetically and electrically conductive formed on said substrate;

a first electrically conductive contact element layer formed over said first pole/shield layer;

a first magnetic biasing layer of a magnetic material formed over said first contact element layer;

a giant magnetoresistive sensor having parallel sides disposed over said first magnetic layer and formed of alternating thin layers of magnetically conductive and nonconductive materials;

a second magnetic biasing layer of a magnetic material formed over said giant magnetoresistive sensor;

said first and second magnetic biasing layers being parallel to said sides of said giant magnetoresistive sensor;

a second electrically conductive contact element layer disposed over said second magnetic layer;

a second pole/shield layer that is both magnetically and electrically conductive formed on said second contact element layer; and electrically conductive, magnetically nonconductive spacers located between the sides of said giant magnetoresistive sensor and said first and second magnetic biasing layers respectively.

12. The magnetic head of claim 11 wherein at least one of said first and second magnetic layers is a permanent magnet.

13. The magnetic head of claim 11 wherein at least one of said first and second magnetic layers is a soft film coupled with an antiferromagnetic layer.

* * * * *

UNITED STATES PATENT AND TRADEMARK OFFICE
CERTIFICATE OF CORRECTION

PATENT NO : 5,883,763
DATED     : 03/16/99
INVENTOR(S): Yuan et al.

It is certified that error appears in the above-identified patent and that said Letters Patent is hereby corrected as shown below:

Page 1, line 3, insert

This invention was made with Government support under a Cooperative Agreement (CRADA TC-840-94) and the Managing and Operating Contract (W-7405-ENG-48) with the Regents of the University of California. The Government has certain rights in this invention.

Signed and Sealed this

Sixteenth Day of November, 1999

Attest:

Q. TODD DICKINSON

Attesting Officer

Acting Commissioner of Patents and Trademarks